United States Patent [19]

Person

[11] Patent Number: 5,067,081

[45] Date of Patent: Nov. 19, 1991

[54] PORTABLE ELECTRONIC NAVIGATION AID

[76] Inventor: Carl E. Person, 221 W. 41st St., New York, N.Y. 10036

[21] Appl. No.: 400,324

[22] Filed: Aug. 30, 1989

[51] Int. Cl.⁵ .............................................. G06F 15/50
[52] U.S. Cl. ..................................... 364/444; 340/995; 73/178 R
[58] Field of Search .......................... 364/443, 444, 449; 73/178 R; 340/988, 990, 995

[56] References Cited

U.S. PATENT DOCUMENTS

| | | | |
|---|---|---|---|
| 4,481,584 | 11/1984 | Holland | 364/443 |
| 4,546,439 | 10/1985 | Gene Esparza | 364/444 |
| 4,570,227 | 2/1986 | Tachi et al. | 364/444 |
| 4,796,189 | 1/1989 | Nakayama et al. | 364/444 |
| 4,878,170 | 10/1989 | Zeevi | 364/444 |
| 4,926,336 | 5/1990 | Yamada | 364/449 |
| 4,937,753 | 6/1990 | Yamada | 364/449 |
| 4,951,211 | 8/1990 | De Villeroche | 364/444 |

Primary Examiner—Gary Chin
Attorney, Agent, or Firm—Kenneth A. Roddy

[57] ABSTRACT

A portable electronic navigation apparatus and method utilizes universal latitude and longitude coordinates of geographic points and landmarks for determining current location or a specific destination and the distance and bearing thereof relative to landmark data input by the user. Latitude and longitude of population centers (e.g., cities, towns), major buildings, airports, and other landmarks in a geographical area are stored in a first memory. Latitudinal and longitudinal data for roadways in the area are stored in a second memory. A third permanent memory stores programs to; calculate the distance between two known points; look up and retrieve stored information; store and erase data upon the user's instruction; accept corrections to stored data; and to display the data on a screen in relation to its latitude and longitude along with name, mileage, and bearing or destination data corresponding to the related geographical feature or landmark. Destination, current or hypothetical location, latitude and longitude adjustments, other data, and requests for navigational information is input by a keyboard. Roads, population centers, airports, buildings, other landmarks, mileages, and bearings or directions according to the oeprator's request is displayed visually or vocally. The user may specify a radius around the current or destination location, and receive the distance between the destination and any other geographical feature, landmark, or roadway within the designated radius or within the designated path width.

31 Claims, 4 Drawing Sheets

PORTABLE ELECTRONIC NAVIGATION AID

BACKGROUND OF THE INVENTION

1. Field of the Invention

This invention relates generally to navigation systems, and more particularly to a portable electronic navigation apparatus and method utilizing universal latitude and longitude coordinates of geographic points and landmarks for aiding in the determination of a specific geographical destination and the distance thereof relative to landmark data input by the user.

2. Brief Description of the Prior Art

Often a traveler in a vehicle, boat, bicycle, or on foot needs help to get to his or her destination. If the traveler has a map, the map may not have sufficient information to be able to pinpoint the current location, because most maps present substantially fewer than all population centers (i.e., towns, villages, municipalities, and cities). Also, maps often leave the reader lost somewhere within a 25 square mile area after looking up the X and Y coordinates for a town not actually depicted presented by a dot and name on the map. Also, the vast amount of detail included in a tiny area on many maps makes it hard to find a specific place even if it is presented by a dot and name on the map.

Computer navigational devices are known in the art. There are several patents which disclose various navigational aids and systems designed to be used by travelers in vehicles, most of which depend upon vehicle motion sensors for their operation.

Tanaka et al, U.S. Pat. No. 4,608,656 discloses a road map display system coupled with a vehicle sensor wherein vehicle position and direction is graphically represented as a mark on a map. A digital memory stores digitized road map data in the form of points on a map relative to an X and Y coordinate system, the vehicle sensor detects vehicle placement and distance traveled from a starting point and produces a signal representing the vehicle location relative to the coordinates, a scale selector enlarges the map when the vehicle is in a certain distance of a preselected point and produces a second signal representative of the scale. The digitized map data is transformed by a display memory into a second coordinate system which is displayed about the vehicle position.

Nakamura, U.S. Pat. No. 4,660,037 discloses a road map display system coupled with a vehicle sensor wherein the current vehicle position and direction is graphically represented on a map. A digital memory stores digitized road map data in the form of digital information taken pixel by pixel in the raster mode (optical disc) and the vehicle sensor detects the current travel distance and direction from a starting point and produces a signal representing the vehicle location in two-dimensional (X-Y) coordinates. A regeneration unit (laser) reads out the geographical information from time to time during travel. The digitized map data is transformed by a display memory into a second coordinate system which graphically displays a mark for the current location, a mark for the direction of travel, and a mark indicating the accumulated path of travel.

Tsujii, U.S. Pat. No. 4,679,147 discloses a road map display system coupled with several vehicle sensors wherein a cathode ray tube displays road map information and vehicle tracing information with the vehicle superimposed on the map. A bearing sensor utilizes magnetism and provides analog quantities representative of the X-Y coordinates. An optical fiber sensor detects the vehicle running direction and provides a relative bearing. A vehicle speed sensor generates pulses which provide a signal representative of the vehicle running distance. The data is stored in memory and a controller selects information corresponding to the current location for display. The controller sets specified circular areas centered on respective crossings on the road map, detects arrival of the of the vehicle at the entrance to a particular area, and gives a voice instruction for running the vehicle at the crossing.

Hanabusa et al, U.S. Pat. No. 4,737,927 discloses a road map display system coupled with several vehicle sensors which stores map data such as rivers, roads, streets, principle buildings, etc., and various corresponding name information and only the selected name information is displayed on the screen with the map using its name or capital letter. It includes a vehicle heading sensor and distance sensor, and a control unit responsive to the signals for displaying a map on the display. The map data is divided into sections with corresponding names. It is only necessary to search the name information group in the relevant section.

Haeussermann, U.S. Pat. No. 4,733,356 discloses a hand held control device for vehicle route guidance which may be used alone or installed in an on-board computer system. The hand held unit comprises a plug-in compartment which receives a road network memory chip, a route computer, operating system, and its own display, which allows preselection of the route functions outside the vehicle. The system functions are divided into "pre-trip" and "during the trip". Pre-trip functions performed with the hand-held unit are: starting point and destination, calculation of the optimum route, adaption of the route to traffic conditions or personal requirements, and preselecting the route in which automatic route indication is to be carried out. During the trip functions are carried out when the hand-held device is plugged into the on-board computer.

The present invention is distinguished over the prior art in general, and these patents in particular by a portable electronic navigation apparatus and method which utilizes universal latitude and longitude coordinates of geographic points and landmarks for determining current location or a specific destination and the distance and bearing thereof relative to landmark data input by the user. Latitude and longitude of population centers (e.g., cities, towns), major buildings, airports, and other landmarks in a geographical area are stored in a first memory. Latitudinal and longitudinal data for roadways in the area are stored in a second memory. A third permanent memory stores programs to; calculate the distance between two known points; look up and retrieve stored information; store and erase data upon user's instruction; accept corrections to stored data; and to display the data on a screen in relation to its latitude and longitude along with name, mileage, and bearing or destination data corresponding to the related geographical feature or landmark. Destination, current or hypothetical location, latitude and longitude adjustments, other data, and requests for navigational information is input by a keyboard. Roads, population centers, airports, buildings, other landmarks, mileages, and bearings or directions according to the operator's request is displayed visually or vocally. The user may specify a radius around the current or destination location, and receive the distance between the destination and any other geographical feature, landmark, or roadway within the designated radius or within the designated path width.

The present invention does not require inputting settings into the system before making use of it, unlike other navigational systems and is significantly less costly to build than systems requiring the attachment of bearing and speed sensors to a moving vehicle, reading the results into the device, and computing the present location and heading from such ever-changing data. The sensors also make these other systems non-portable.

SUMMARY OF THE INVENTION

It is therefore an object of the present invention to provide an apparatus and method for aiding in the determination of a specific geographical destination utilizing universal latitudinal and longitudinal coordinates and the distance of the destination relative to landmark data input by the user.

It is another object of this invention to provide an apparatus and navigational system to determine a specific geographical point or place utilizing precise universal latitude and longitude coordinates rather than traditional X and Y map coordinates which vary among different maps.

Another object of this invention is to provide a portable, self-contained navigational apparatus which does not require the use of expensive vehicle bearing, motion, and distance detectors and sensors for inputting data.

Another object of this invention is to provide a portable, self-contained navigational apparatus which is not connected with a vehicle and does not depend upon the use of expensive vehicle bearing, motion, and distance detectors and sensors for its input or operation.

Another object of this invention is to provide a portable, self-contained navigational apparatus whereby the user may navigate between the present location and any final or intermediate destination by setting the width of a path between the two points and calling up the same information falling within the designated path.

A further object of this invention is to provide a portable, self-contained navigational apparatus whereby the user may set a desired radius from the current or designated location for displaying points or landmarks such as population centers, roads, airports, buildings, and other landmarks to determine precisely where the current or designated location is within the context of the surrounding points or landmarks.

A still further object of this invention is to provide a portable, self-contained navigational apparatus which is simple in design and construction, economical to manufacture, and reliable in use.

Other objects of the invention will become apparent from time to time throughout the specification and claims as hereinafter related.

The above noted objects and other objects of the invention are accomplished by a portable electronic navigation apparatus and method which utilizes universal latitude and longitude coordinates of geographic points and landmarks for determining current location or a specific destination and the distance and bearing thereof relative to landmark data input by the user. Latitude and longitude of population centers (e.g., cities, towns), major buildings, airports, and other landmarks in a geographical area are stored in a first memory. Latitudinal and longitudinal data for roadways in the area are stored in a second memory. A third permanent memory stores programs to; calculate the distance between two known points; look up and retrieve stored information; store and erase data upon the user's instruction; accept corrections to stored data; and to display the data on a screen in relation to its latitude and longitude along with name, mileage, and bearing or destination data corresponding to the related geographical feature or landmark. Destination, current or hypothetical location, latitude and longitude adjustments, other data, and requests for navigational information is input by a keyboard. Roads, population centers, airports, buildings, other landmarks, mileages, and bearings or directions according to the operator's request is displayed visually or vocally. The user may specify a radius around the current or destination location, and receive the distance between the destination and any other geographical feature, landmark, or roadway within the designated radius or within the designated path width.

DESCRIPTION OF THE PREFERRED EMBODIMENT

Figure 1:
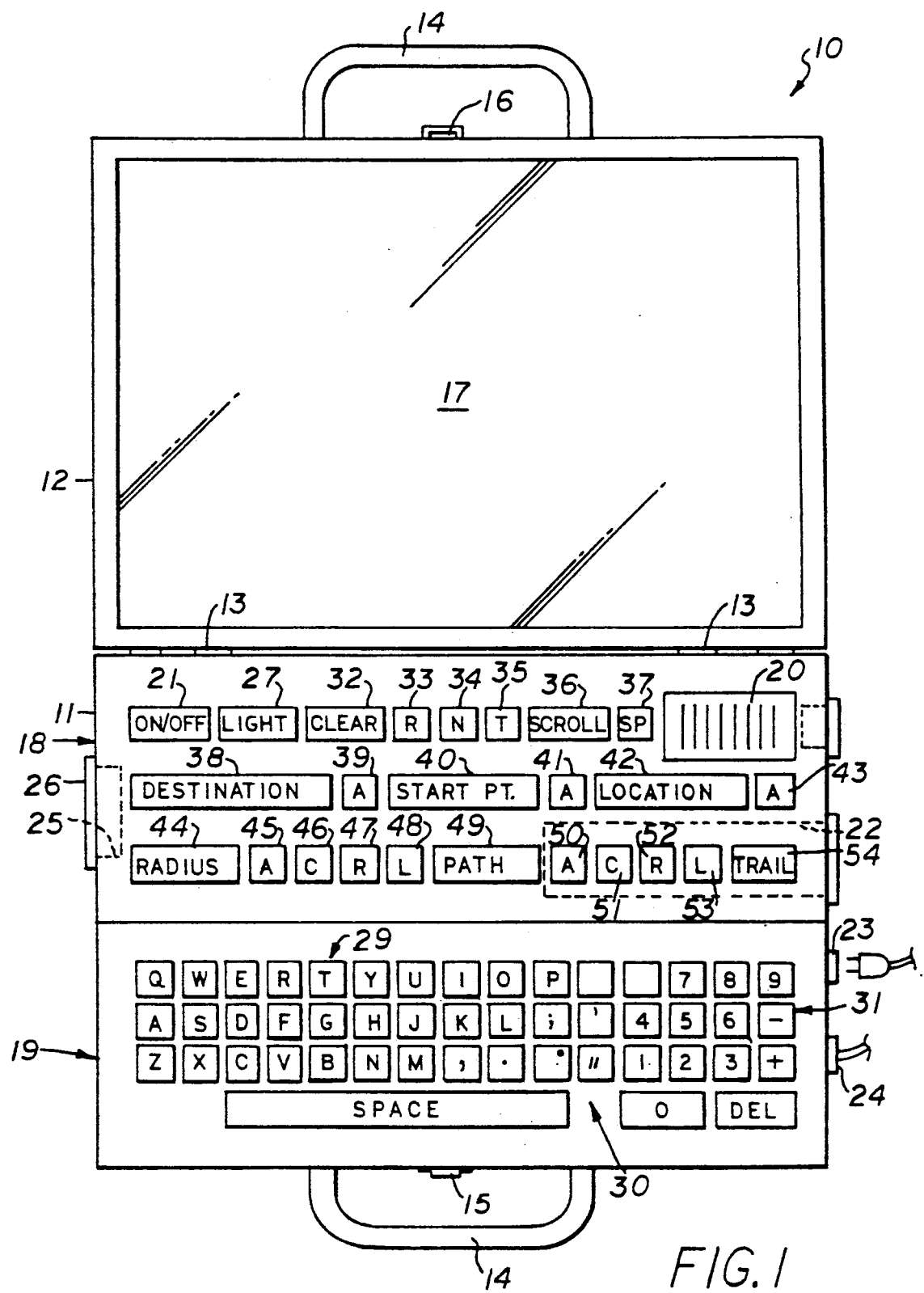
FIG. 1 is a top plan view of the portable navigation aid apparatus showing the layout of individual switches and other controls on an operation panel.

Referring to the drawings by numerals of reference, a portable navigation apparatus 10 is shown in the open position in FIG. 1. The apparatus 10 comprises a generally rectangular case or housing 11 having a lid 12 hinged at one end thereto by hinges 13. The housing 11 and lid 12 are provided with conventional handles 14 for carrying the unit and mating latch members 15 and 16 which may be locked together for maintaining the housing and lid in a folded closed position.

The housing 11 contains a microcomputer including a CPU, ROM, RAM, I/O ports, video display controller, and audio controller, which will be explained in detail hereinafter. A display screen 17 is mounted in the underside of the lid 12. The top surface of the housing 11 has a user input keyboard section 18, an operation control section 19, and a loudspeaker 20 for providing audio output. Power may be supplied to the apparatus 10 through ON/OFF switch 21 by several conventional methods. Dry cells or a rechargeable battery may be carried in a battery compartment 22, the unit may be connected to conventional 120 v. AC with a suitable converter and/or rectifier by means of an electrical connector 23, or if used in a vehicle, the unit may utilize the vehicle power supply by coupling a connector 24 to the vehicle cigarette lighter receptical.

In addition, the portable navigation apparatus 10 has a plug-in compartment 25 into which an external memory storage device 26, such as a IC memory chip, a floppy disk, compact disk, or cassette tape can be inserted and connected to the internal microcomputer, whereby the navigational areas may be selectively changed by exchanging the external memory storage device.

A light control switch 27 on the operation control section 18 controls a light source to allow use of the navigational apparatus during non-daylight hours. The light source (not shown) may be located on the lid to direct light on the operation control and keyboard sections 18 and 19, or may be located beneath the surface of the housing to backlight the keys and switches.

Figure 2:
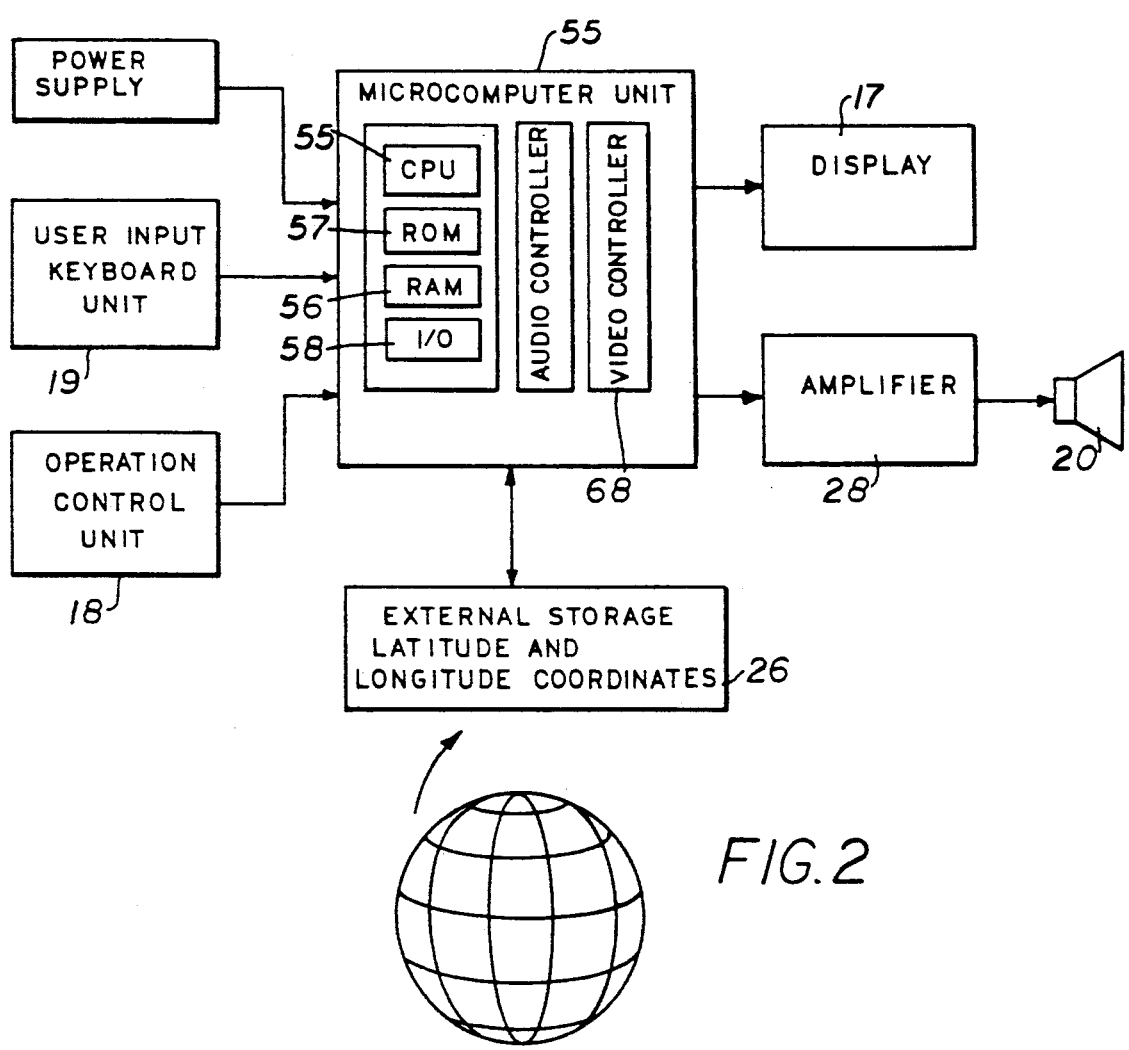
FIG. 2 is a block diagram showing schematically the overall construction of a navigation system according to an embodiment in accordance with the present invention.

Referring additionally to FIG. 2 of the drawings, the overall construction of the portable navigation system is shown schematically in block diagram. The external memory storage device 26 contains navigational data corresponding to the latitude and longitude coordinates in degrees, minutes, and seconds for the approximate physical center of various points or landmarks in the geographical area or areas to be navigated along with the name and state in which they are located. In dedicated systems, the navigational data may be stored in ROM memory. The preferred points or landmarks comprise population centers such as cities, towns, municipalities, and villages, major buildings and other buildings, airports and other landmarks. The external memory storage device or devices 26 preferably cover geographical areas such as a county, state, region, country, or continent.

External memory devices may also contain the latitude and longitude coordinates, in a linear continuum, along with the identity, and category of roadways and other linear landmarks within a geographical area such as interstate highways, state highways, roads, rivers, railways, and boundary lines.

The operational control unit 18 allows the navigational data to be read into the temporary memory storage of the microcomputer and processed by the CPU in response to user input from the keyboard unit 19. The navigational data is calculated relative to other data inputted by the user and is displayed on the display unit 17 in either alphanumeric or graphic form or a combination of both by means of a video control circuit in the microcomputer unit. Navigational data may optionally be converted by an audio control circuit in the microcomputer and outputted as a synthesized voice through loudspeaker 20 coupled with an amplifier 28. The navigational data remains in temporary memory storage until cleared or changed by the user.

Having briefly described the major components of the portable navigation apparatus, a more detailed description of the components will be undertaken for an understanding of the operational features. Referring again to FIG. 1 of the drawings, the user input keyboard section 19, has a plurality of alphabetical letter keys 29, symbol keys 30, and numeric keys 31 which are disposed in a fashion similar to common computer keyboards by which the user types information into the I/O unit of the microcomputer corresponding to geographic locations and other data and to edit or make changes to the output information supplied by the system.

The operation control section 18, has a plurality of keys or switches by which the user can activate and control the operation of the microcomputer. There are several main control switches and several smaller switches. The size of the key or switch indicates that it is a main control and the smaller switches located to the right side of certain main switches relate to the operation of the main switch. The ON/OFF switch 21 controls the power supplied to the system including the display 17. The light switch 27 turns on the light source (not shown) for lighting the control switches and keyboard keys.

The main "clear" switch 32 clears all temporarily stored data which has been calculated by the system or inputted by the user such as adjustments to temporarily stored data. The smaller switch to the right of the "clear" switch 32 is a "select record" switch 33 which causes a display on the screen 17 of temporarily stored data record by record and permits deletion on a record by record basis. A "select number" switch 34 allows the user to delete a temporarily stored record by typing the record number on the keyboard. A "select type" switch 35 allows the user to delete a temporarily stored record by typing the name of the population center, airport, building or other landmark on the keyboard. The "scroll" control switch 36 starts and stops the screen displays created by the use of the other control switches. Switch 37 is an audio ON/OFF switch which controls the optional operation of the loudspeaker 20.

"Destination" switch 38 allows the user to designate the destination such as population center, airport, building, or other landmark as the trip destination for temporary storage, and to call up the appropriate data (full name, latitude, and longitude) from permanent memory storage for recording it in temporary memory storage. "Destination adjustment" switch 39 allows the user to adjust the temporary latitude and longitude for the destination by either correcting the data directly, or by adding latitude and longitude where none exists in permanent storage for a destination, or by making adjustments in feet, miles, meters, kilometers, or fractions thereof for temporary memory storage.

The main "start" switch 40 allows the user to designate the starting point or a new starting point for a trip by typing in the name or first few letters of a geographical point or landmark such as a population center, airport, building, or other landmark. The starting point data is recorded in temporary memory storage. Switch 40 will also call up from permanent memory storage the appropriate data (full name, latitude, and longitude) relative to inputted starting point data and send it to temporary memory storage.

If the latitude and longitude does not exist in permanent memory storage, the user may add the name and/or coordinates to the starting point data in temporary memory storage by using the "start adjustment" switch 41. The switch 41 also allows the user to adjust coordinates sent to temporary memory storage from permanent memory storage.

Upon calling up a latitude and longitude from permanent memory storage into temporary memory storage, the user can make adjustments to the data by either correcting the data directly, or by adding latitude and longitude where none exists in permanent storage for the starting point, or by making adjustments in feet, miles, meters, kilometers, or fractions thereof.

The current or designated "location" main switch 42 allows the user to input nearby points or landmarks along the route such as population centers, airports, buildings, or other landmark by name for which guidance or reference is or may be sought. This brings up the latitude and longitude from permanent storage (which can be adjusted at that time) and is then put into temporary storage together with the full name of the location. Each successive current or designated location which is added by the user is placed into temporary storage in the order inputted, thereby preserving a navigational trail of these problem locations. The last inputted location remains the current or designated location for purposes of the radius and path control switches described below. If the user wants to use a different location with such controls, the user would input the location, use the controls, then delete the location if desired.

The "location adjustment" switch 43 allows the user to adjust the temporary latitude and longitude for the current or designated location by either correcting the data directly, or by adding latitude and longitude where none exists in permanent memory storage for the location, or by making adjustments in feet, miles, meters, kilometers, or fractions thereof for temporary storage.

The "radius" main control switch 44 allows the user to set in temporary storage a desired radius from the current or designated location for displaying points or landmarks such as population centers, airports, buildings, roads, rivers, and other landmarks to determine precisely where the current or designated location is within the context of the surrounding points or landmarks. The radius can be expressed in feet, miles, meters, kilometers, or fractions thereof. The set radius remains in temporary storage until cleared or changed by reuse of the control switch 44.

The "radius all display" control switch 45 causes a display on the screen of the points or landmarks such as population centers, airports, buildings, roads, rivers, and other landmarks falling within the radius around the current or designated location, and display at the same time the mileage between the inputted location and the destination, and the bearing or direction to the destination. A dot appears on the screen representing each point such as population center, airport, building, or other landmark, or as a line representing each road, river, railway, or boundary line. The dot or line is positioned on the screen relative to the latitude and longitude of the geographical feature it represents.

A "city radius display" control switch 46 causes a display on the screen of a dot representing only cities or population centers falling in whole or in part within the radius around the current or designated location, and displays at the same time the mileage between the location and the destination and the bearing or direction to the destination. The dot is positioned on the screen relative to the latitude and longitude of the population center it represents. In more sophisticated systems, each type of population center may be further distinguished by size of the dot or different colors.

A "road radius display" control switch 47 causes a display on the screen of a line for each road falling in whole or in part within the radius around the current or designated location. The line is positioned on the screen in relation to the latitude and longitude of the road or road segments the line represents. Road radius display switch 47 also gives the user the option to select categories of roads, such as all interstate highways, all state highways, and all lesser roads contained in permanent storage, together with the name for each road. In more sophisticated systems, each type of road may be further distinguished by line size or by different colors.

While switch 47 is described as a "road radius display" switch 47, it should be understood, that the switch may also function to display any other types of linear landmarks, such as river, railways, and boundary lines which may be stored in memory as a linear continuum of points.

A "landmark radius display" control switch 48 causes a display on the screen of a dot for each airport, building, or other landmark contained in permanent storage falling in whole or in part within the radius around the current or designated location, and displays at the same time the name of the feature, the mileage between the location and the destination and the bearing or direction to the destination. The dot is positioned on the screen relative to the latitude and longitude of the geographic feature it represents. In more sophisticated systems, each type of landmark (airport, building, or other landmark) may be further distinguished by different colors.

The "path" main control switch 49 allows the user to set in temporary memory storage the width of a path extending from the current or designated location to the desired destination for displaying points or landmarks such as population centers, roads, airports, buildings, and other landmarks. Thus, permitting the user to line up the landmarks to look for while heading toward the destination. The path can be expressed in feet, miles, meters, kilometers, or fractions thereof. The set path width remains in temporary storage until cleared or changed by reuse of the control switch 49.

A "path all display" control switch 50 causes a display on the screen of all points or landmarks such as population centers, airports, buildings, roads, rivers, and other landmarks falling within the designated path from the current or designated location to the destination, and displays at the same time the mileage between the location and the destination and the bearing or direction to the destination. The dot (for each population center, airport, building, or other landmark) or line (for each road or linear landmark) is positioned on the screen relative to the latitude and longitude of the geographical feature it represents.

A "path city display" control switch 51 causes a display on the screen of a dot for each population center falling in whole or in part within the path from the current or designated location to the destination, and displays at the same time the mileage between the location and the destination and the bearing or direction to the destination. The dot is positioned on the screen relative to the latitude and longitude of the population center it represents. In more sophisticated systems, each type of population center may be further distinguished by size of the dot or by different colors.

A "path road display" control switch 52 causes a display on the screen of a line for each road falling in whole or in part within the path extending from the current or designated location to the destination. The line is positioned on the screen in relation to the latitude and longitude of the road or road segments the line represents. Path road display switch 52 also gives the user the option to select categories of roads, such as all interstate highways, all state highways, and all lesser roads contained in permanent storage, together with the name for each road. In more sophisticated systems, each type of road may be further distinguished by line size or by different colors.

While switch 52 is described as a "path road display" switch, it should be understood, that the switch may also function to display any other types of linear landmarks, such as river, railways, and boundary lines which may be stored in memory.

A "path landmark display" switch 53 causes a display on the screen of a dot for each airport, building, or other landmark contained in permanent storage falling in whole or in part within the path between the current or designated location and the destination, and displays at the same time the name of the feature, the mileage between the location and the destination and the bearing or direction to the destination. The dot is positioned on the screen relative to the latitude and longitude of the geographic feature it represents. In more sophisticated systems, each type of landmark (airport, building, or other landmark) may be further distinguished by different colors.

The "trail display" control switch 54 displays all temporarily stored locations, their latitude and longitude, their mileages to the destination, and their bearing or direction to the destination. This is to display a trail for the user of all current or designated locations or problem points in the order in which they were inputted. This stored data may be displayed as a text record or as a graphic map display.

While the above description utilizes "roadways" as an example of a landmark, it should be understood, that this feature may also incorporate other types of linear landmarks, such as river, railways, and boundary lines which may be stored in memory as a linear continuum of latitude and longitude points.

Figure 3:
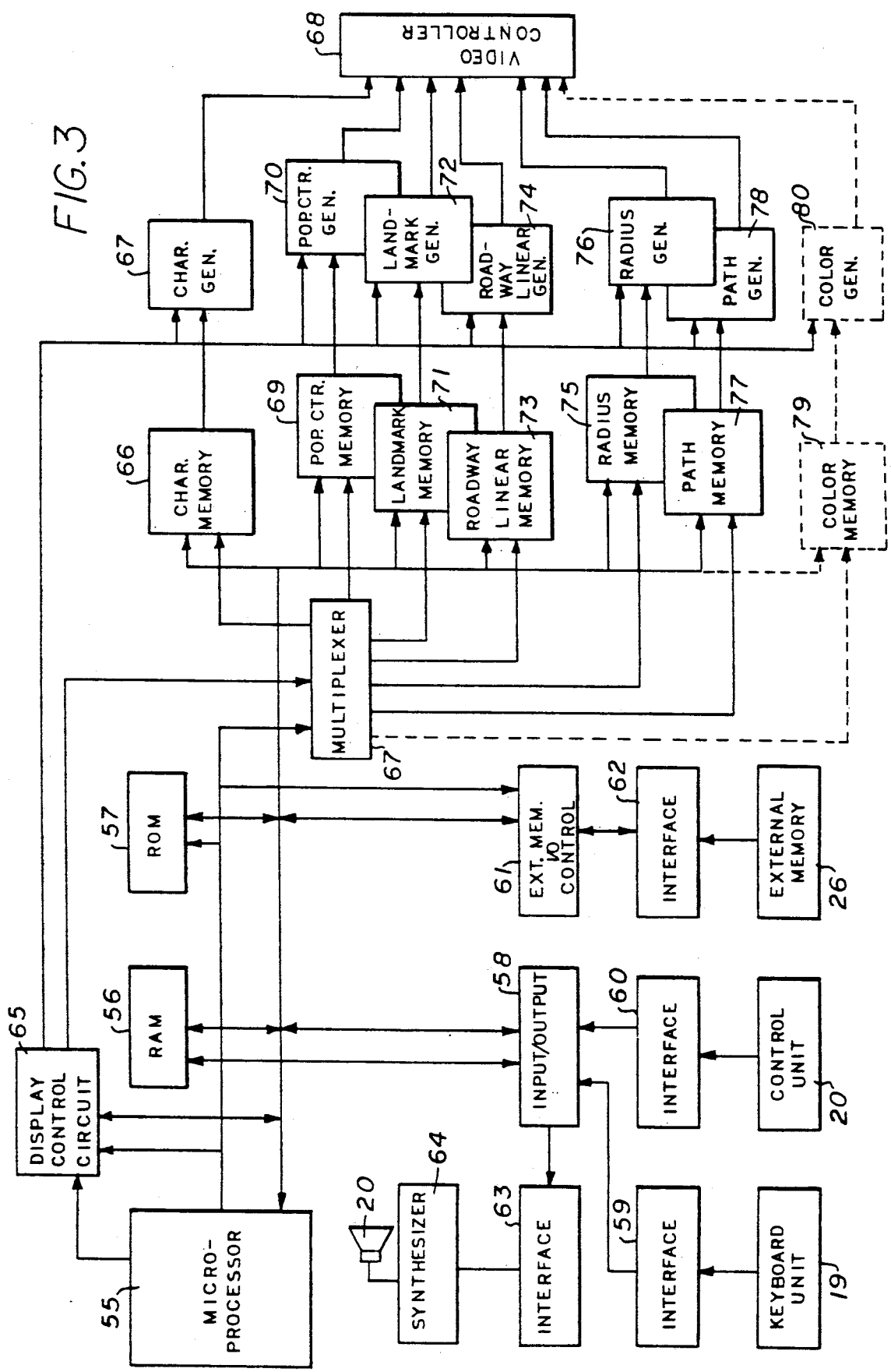
FIG. 3 is a block diagram showing the microcomputer unit of the portable navigation system of the present invention.

Referring now additionally to FIG. 3, it will be explained how these operational features are accomplished by the microcomputer.

A microprocessor 55 powered by the power supply controls the operation of the microcomputer 10. A RAM (random access) memory storage chip 56 temporarily stores data in the course of computation and control of the operation by the microprocessor 55. A ROM (read only) memory storage chip 57 stores programs necessary for various control operations and computation operations by the microprocessor 55. In dedicated systems, ROM memory storage may also store the same type of navigational data as the external memory described below. An I/O (input/output) integrated control circuit 58 is adapted to input various data from interfaces 59 and 60 to the microprocessor 55. The keyboard unit 19 is connected to the interface 59 and the operation control unit 18 is connected to interface 60. An integrated I/O control circuit 61 for the external memory storage device 26 (such as a memory chip) controls input/output of control signals and data occurring between the external storage device 26 through interface 62 and the microprocessor 55. The I/O control circuit 58 may also be adapted to output various data through an interface 63 and voice synthesizer 64 for transmitting voice data to the loudspeaker 20 via amplifier 28. An integrated display control circuit 65 controls and transmits various display data to the display device.

A character memory 66 which stores character information to be displayed on the display device 17 is accessible, through a multiplexer 67, to the microprocessor 55 and display control circuit 65. A character generator 67 stores patterned information of characters such as alphabetical letters, numerals, and symbols, and responds to outputs of the display control circuit 65 and character memory 66 to select and deliver one of various character patterns stored. Data output from the character generator 67 is transmitted to the display device 17 through a video controller 68.

A population center memory 69 stores information to display a population center on the display device 17 and is coupled with a population center generator 70 which stores symbol and pattern information representing population centers such as cities, towns, municipalities, and villages, and responds to outputs of the display control circuit 65 and population center memory 69 to select and deliver one or more population center symbols or patterns stored.

A landmark memory 71 stores information to display a landmark on the display device 17 and is coupled to a landmark generator 72 which stores symbol and pattern information representing landmarks such as airports, buildings, parks, or other notable landmarks, and responds to outputs of the display control circuit 65 and landmark memory 71 to select and deliver one or more landmark symbols or patterns stored.

A roadway or linear memory 73 stores information to display roadways and other linear landmarks on the display device 17 and is coupled with a roadway or linear generator 74 which stores linear symbol or pattern information representing roads, such as interstate highways, state highways, county and farm roads and lesser roads, and/or linear landmarks such as rivers, railways, and boundary lines, and responds to outputs of the display control circuit 65 and roadway or linear memory 73 to select and deliver one or more of various linear symbols or patterns stored.

A radius memory 75 stores information to display a radius on the display device 17 and is coupled with a radius generator 76 which stores radius pattern information and responds to outputs of the display control circuit 65 and radius memory 75 to select and deliver one of various radius patterns stored.

A path memory 77 stores information to display a path on the display device 17 and is coupled with a path generator 78 which stores path pattern information and responds to outputs of the display control circuit 65 and radius memory 77 to select and deliver one of various path patterns stored.

In more sophisticated systems, data may be displayed in colors. A graphic color memory 79 stores data of primary colors and is coupled with a color generator 80 and is accessible through multiplexer 67 to the microprocessor 55 and the display device 17 for providing various graded color data.

The character memory 66, population center memory 69, landmark memory 71, roadway or linear memory 73, radius memory 75, path memory 77 (and optional graphic color memory 79) are each accessible, through multiplexer 67, to the microprocessor 55 and display control circuit 65.

Data output from the character generator 67, population center generator 70, landmark generator 72, roadway or linear generator 74, radius generator 76, path generator 78 (and optional graphic color generator 80) is transmitted to the display device 17 through a video controller 68.

OPERATION

Figure 4:
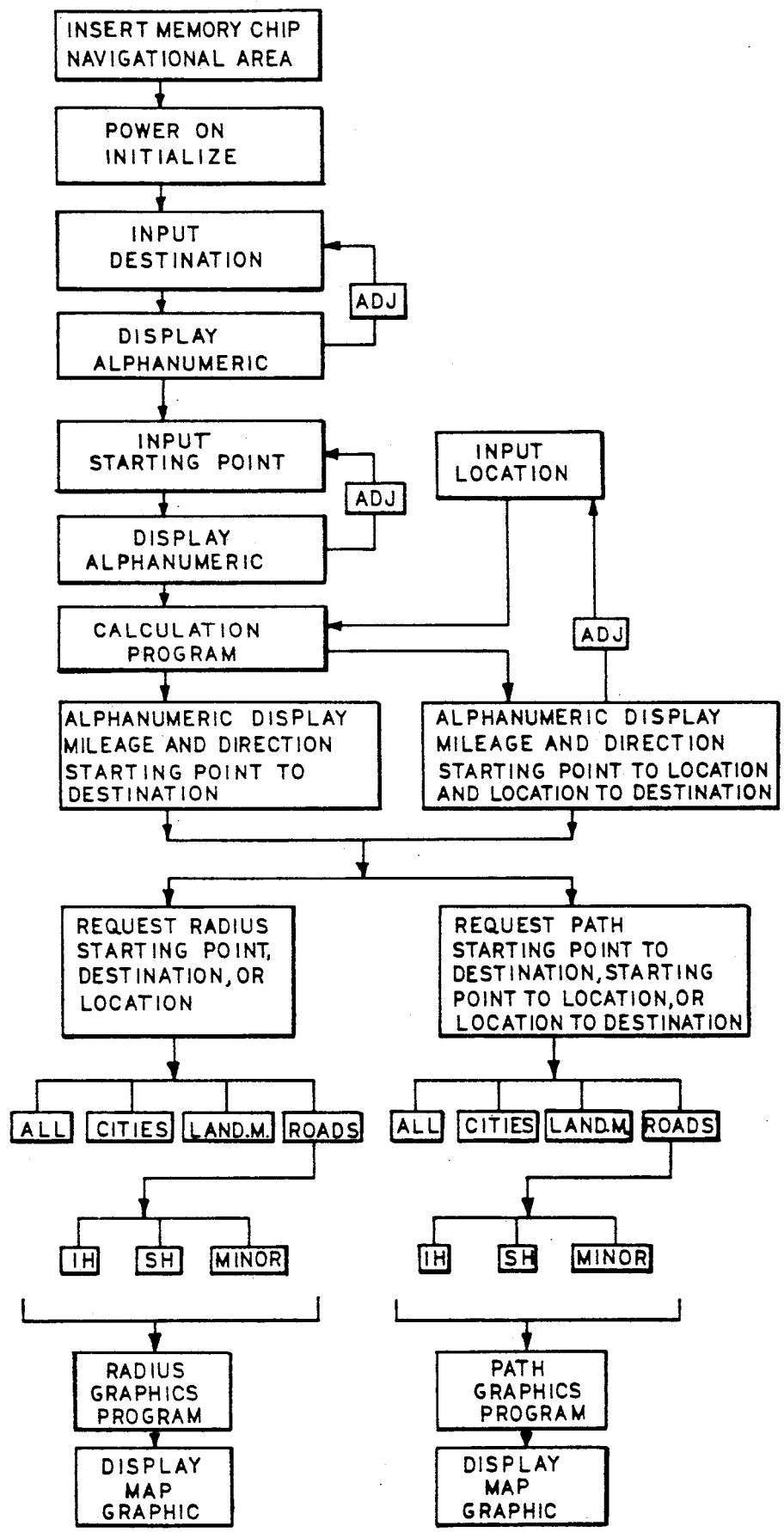
FIG. 4 is a flow diagram showing the steps in the operation of the portable navigation system of the present invention.

Referring now additionally to FIG. 4, the operation of the portable navigation system will be described.

After the external memory device 26 for the area to be navigated, such as a memory chip, has been inserted into the slot 25, the ON/OFF switch 21 is turned on and the system is powered up and initialized in accordance with an initializing program stored in ROM memory 57. The light switch 27 may also be turned on to illuminate the keyboard and control units 19 and 18. After start-up, the system is ready for receiving commands from the control unit 18 and user input from the keyboard unit 19.

The user pushes the "destination" switch 38 and a destination program in ROM memory 57 prompts the user for the name or first few letters of the destination. The destination may be a population center, airport, building, or other landmark. After receiving the destination data, the program records it in temporary memory 57 and calls up from memories 69, 71, and 73 or external memory 26 the appropriate data (full name, latitude, and longitude) from storage, records it in temporary memory storage 56, and displays the information on the display screen alphanumerically. If the data is not found in memory storage, the user is prompted to enter or adjust. The user may then push "destination adjust" switch 39 and then type in or edit the name and/or latitude and longitude for the destination. After receiving the destination input the program records it in temporary memory storage 56.

The user pushes the main "start" switch 40 and a starting point program in ROM memory 57 prompts the user for the name or first few letters of the starting point for the trip. The starting point may also be a geographical point or landmark such as a population center, airport, building, or other landmark. After receiving the starting point data, the program records it in temporary memory 56 and calls up from memories 69, 71, and 73, or external memory 26, the appropriate data (full name, latitude, and longitude) from storage, records it in temporary memory storage 56, and displays the information on the display screen alphanumerically. If the data is not found in memory storage, the user is prompted to enter or adjust. The user may then push "start adjust" switch 41 and then type in or edit the name and/or latitude and longitude for the starting point. After receiving the starting point input the program records it in temporary memory storage 56.

At this point the destination and starting point data have been entered into temporary memory. The user may then press the main "trail" switch 54 and a calculation program in ROM memory will calculate the difference in the latitude and longitude coordinates, convert the calculated data to mileage, determine the bearing or direction from the starting point to the destination, and display on the screen the mileage and bearing or direction to the destination from the starting point. It should be noted, that the displayed mileage and direction are linear from point to point and the information is displayed alphanumerically.

The user may now press the "start" control switch 40 or "destination" control switch 38 followed by the main "radius" control switch 44 and the program in ROM memory will prompt the user to type in a radius from the keyboard. The radius can be expressed in feet, miles, meters, kilometers, or fractions thereof. After the radius has been entered in temporary memory, the calculation program in ROM memory will calculate a radius surrounding the "start" or "destination" coordinates and prompt the user to enter either "all", "cities", "landmarks" or "roads" (switches 45–48). If "all" 45 is entered, the program will retrieve the appropriate points or landmarks such as population centers, roads, airports, buildings, and other landmarks having coordinates within the selected radius from memory storage, place them in temporary memory, and through a radius generation program 76 in memory 75 graphically display a radius of the appropriate points or landmarks within the selected radius on the screen.

In this manner, the user may see the points and landmarks in the selected radius surrounding the starting point and/or destination. A dot appears on the screen representing each point or landmark and each is positioned on the screen relative to the latitude and longitude it represents. The alphanumeric mileage between the location and the destination and the bearing or direction to the destination may also be displayed on the screen at the same time.

Pressing the "city" control switch 46 operates the same way but the program searches only population center memory 69 which through generator 70 causes display of dots representing only cities or population centers falling in whole or in part within the radius around the starting point or destination. Pressing the "landmarks" control switch 48 causes only memory 71 to be searched and through generator 72 only landmarks falling in whole or in part within the selected radius are displayed. Pressing "road" control switch 47 causes only memory 73 to be searched and through generator 74 only lines representing roadways falling in whole or in part within the radius around the starting point or destination are displayed together with the name for each road.

While switch 47 is described as a "road radius display" switch 47, it should be understood, that the switch may also function to display any other types of linear landmarks, such as rivers, railways, and boundary lines which may be stored in memory.

The program in ROM memory recognizes that the "road" switch 47 has been pressed and will prompt the user to select categories of roads, such as interstate highways, state highways, and minor roads, and in response to the entry will display only the selected types of roadways together with the name for each road.

Characters, letters, and/or symbols are stored in character memory 66 and displayed through character generator 67 responsive to outputs of the display control circuit 65 to select and deliver various character patterns stored. Data output from the character generator 67 is transmitted to the display device 17 through a video controller 68.

The user may also press the "start" control switch 40 or "destination" control switch 38 followed by the main "path" control switch 49 and the program in ROM memory will prompt the user to type in a path width from the keyboard. The path width can be expressed in feet, miles, meters, kilometers, or fractions thereof. After the path width has been entered in temporary memory, the calculation program in ROM memory will calculate a path from the "start" coordinates to the "destination" coordinates and prompt the user to enter either "all", "cities", "landmarks" or "roads" (switches 50–53). If "all" 50 is entered, the program will retrieve the appropriate points or landmarks such as population centers, roads, airports, buildings, and other landmarks having coordinates within the selected path width from memory storage, place them in temporary memory, and through path generation program 78 in path memory 77 graphically display a path of the appropriate points or landmarks within the selected path on the screen.

In this manner, the user may see the points and landmarks in the path between the starting point and the destination. A dot appears on the screen representing each point or landmark or a line representing linear landmarks and each is positioned on the screen relative to the latitude and longitude it represents. The alphanumeric mileage between the location and the destination and the bearing or direction to the destination may also be displayed on the screen at the same time.

Pressing the "city" control switch 51 operates the same way but the program searches only memory 69 which through memory 77 and generator 78 causes display of dots representing only cities or population centers falling in whole or in part within the path from the starting point to the destination. Pressing the "landmarks" control switch 53 causes only memory 71 to be searched and through generator 72 only landmarks falling in whole or in part within the selected path are displayed. Pressing "road" control switch 52 causes only memory 73 to be searched and through generator 74 only lines representing roadways falling in whole or in part within the path between the starting point and destination are displayed together with the name for each road.

The program in ROM memory recognizes that the "road" switch 52 has been pressed and will prompt the user to select categories of roads, such as interstate highways, state highways, and minor roads, and in response to the entry will display only the selected types of roadways in the path together with the name for each road.

At any point or points along the way, if the user seeks assistance, the user looks for a road sign indicating a nearby population center, airport, building, or other landmark (such as historic points, parks, stadiums, colleges, museums, etc.), and presses the current or designated "location" main switch 42. Upon detecting the press of the "location" switch 42 a location program in ROM memory prompts the user for the name or first few letters of the location. After receiving the location data, the program records it in temporary memory 56 and calls up from memories 69, 71, and 73, or external memory 26 the appropriate data (full name, latitude, and longitude) from storage, records it in temporary memory storage 56, and displays the information on the display screen alphanumerically. If the data is not found in memory storage, the user is prompted to enter or adjust. The user may then push "location adjust" switch 43 and then type in or edit the name and/or latitude and longitude for the location. After receiving the location input the program records it in temporary memory storage 56.

At this point the destination, starting point, and current or designated location data have been entered into temporary memory. The user may then press the main "trail" switch and a calculation program in ROM memory will calculate the difference in the latitude and longitude coordinates between the starting point and location, the location and the destination, convert the calculated data to mileage, determine the bearing or direction from the starting point to the location and from the location to the destination, and display on the screen the mileage and bearing or direction from the starting point to the location and from the location to the destination. It should be noted, that the displayed mileage and direction are linear from point to point, and the information is displayed alphanumerically. The user has the opportunity of correcting, adjusting, or adding the latitude and longitude to compensate for estimated distance away from the point.

Each successive current or designated location which is added by the user is placed into temporary storage in the order inputted, thereby preserving a navigational trail of these problem locations. The last inputted location remains the current or designated location for purposes of the radius and path control switches described below. If the user wants to use a different location, the user would input the location, use the control display switches, then delete the location if desired.

Pressing the "trail" display control switch 54 displays all temporarily stored locations, their latitude and longitude, their mileages to the destination, and their bearing or direction to the destination. This is to display a trail for the user of all current or designated locations or problem points in the order in which they were inputted. This stored data may be displayed as a text record or as a graphic map display.

In more sophisticated systems, the apparatus may include a graphic color memory 79 for storing data of primary colors and would be would be accessible through multiplexer 67 to the microprocessor 55 and the display device 17 for providing various graded color data.

Another feature of the present invention provided by the roadway or linear storage and generating utilities is that a user may also be able to determine the length of a section of a linear feature such as a road, river, railway, or boundary line. This is accomplished by coupling a mouse or plotter to the I/O (input/output) integrated control circuit 58 and interfaces 59 and 60 to the microprocessor 55.

As described above, the roadway or linear memory 73 stores a linear continuum of points and the roadway or linear generator 74 delivers a line display representing landmarks and each is positioned on the screen relative to the latitude and longitude it represents. The alphanumeric mileage between the location and the destination and the bearing or direction to the destination may also be displayed on the screen at the same time. The user utilizing a mouse or plotter may trace the linear landmark displayed and activate it to plot a starting point and a destination point along the straight or curved line. The microprocessor would then compute mileage or distance between the two points as though they were inputted from the keyboard. In this manner, the user would be able to determine the mileage or distance along a winding road, except for changes in altitude which would affect the true mileage.

The present invention provides a system for determining where a specific geographical point or place (i.e, population center, airport, building, or other landmark) is located, within a few feet, making use of the precise latitude and longitude for each, expressed in degrees, minutes, and seconds, instead of traditional X and Y map coordinates (which have varying distance values among different maps.

The user may set a desired radius (in feet, miles, meters, kilometers, or fractions thereof) from the current location and obtain a display of all or specified types of roads, all population centers, all airports, all major buildings or all buildings, and all other landmarks which are within the system's database. In this way, the user can see on the screen the area in which he is located with great specificity and true relative positioning, even if a map does not contain the location.

Also, the user may use the system to navigate between the present location and any final or intermediate destination by setting the width of a path between the two points and calling up the same information falling within this designated path. This provides a list of population centers, roads, major buildings, and other landmarks to be looked for along the way as a guide for the user.

The effect of this invention is to tailor a more detailed electronic map to the precise needs of the user, thereby filtering out the unnecessary information and permitting significantly more useful information within the confines of the display screen.

While this invention has been described fully and completely with special emphasis upon a preferred embodiment, it should be understood that within the scope of the appended claims the invention may be practiced otherwise than as specifically described herein.

I claim:

1. A portable electronic navigation apparatus utilizing universal latitude and longitude coordinates for determining current location or a specific destination and the distance and bearing thereof relative to landmark data input by a user comprising:

a portable housing;

a microcomputer contained within said housing including; a first memory having stored navigational data representing the identity and latitude and longitude coordinates for the approximate physical center of various points or landmarks in a geographical area to be navigated, a second memory having stored calculation programs to calculate differences in latitude and longitude coordinates, convert the calculated differences to mileage and determine the bearing or direction between the latitude and longitude coordinates, a temporary memory for temporarily storing data in the course of computation, a video display controller, input and output ports, and a central processing unit responsive to user input to control the operation of said memories, said input and output ports, and said video display controller;

a video display screen operatively connected to said microcomputer video display controller;

a keyboard operatively connected to said microcomputer and having user input keys for inputting data and operation control keys for controlling the operation of said microcomputer;

power connection means operatively connected to said microcomputer for connecting said microcomputer to a source of electrical power, external memory receiving means operatively connected to said microcomputer for removably receiving external memory means, external memory means removably received within said external memory receiving means and having additional stored navigation data representing the identity and latitude and longitude coordinates for the approximate physical center of various points or landmarks in a geographical area to be navigated, said navigational data being read from said first memory said external memory means into said temporary memory and processed by said central processing unit responsive to user input from said keyboard and calculated by said programs in said second memory relative to other data inputted by the user and the results of the calculations displayed on said video display screen by said video controller, whereby upon the user typing in a destination location said microcomputer records the destination location in said temporary memory and retrieves from said first memory or said external memory means the identity of the destination location and its latitude and longitude coordinates and displays the retrieved information on said video display screen or indicates that the destination location does not exist in said first memory or said external memory means, and the user can selectively edit the retrieved information or add the destination location data by typing in the identity or latitude and longitude coordinates for the destination location and record the edited data in said temporary memory, and upon the user typing in a starting location or a current location said microcomputer records the starting location or current location in said temporary memory and retrieves from said first memory or said external memory means the identity of the starting location or current location and its latitude and longitude coordinates and displays the retrieved information on said video display screen or indicates that the starting or current location does not exist in said first memory or said external memory means, and the user can selectively edit the retrieved information or add the starting location or current location data by typing in the identity or latitude and longitude coordinates for the starting location or current location and record the edited data in said temporary memory, and after the destination location and starting location or current location data have been entered into said temporary memory, the user presses a key to cause one of said programs in said second memory to calculate the differences between the latitude and longitude coordinates of the destination location and the starting location or current location, convert the calculated differences to mileage, determine the bearing or direction from the starting location to the destination location, and display the mileage and bearing or direction from the starting location to the destination location on said video display screen.

2. A portable electronic navigation apparatus according to claim 1 wherein said points or landmarks contained in said first memory and said external memory means comprise the latitude and longitude coordinates of the approximate physical center of cities, towns, municipalities, villages, buildings, airports, and physical landmarks, and including data representing the identity of each of said points or landmarks.

3. A portable electronic navigation apparatus according to claim 1 wherein said points or landmarks contained in said first memory and said external memory means comprise latitude and longitude coordinates in a linear continuum representing linear landmarks of the type comprising highways, roads, rivers, railways, and boundary lines, and including data representing the identity and category of each of said linear landmarks, and said linear landmarks are visually displayed on said video display screen as a line positioned on the screen in a pattern corresponding to the latitude and longitude of said linear continuum of said coordinates, and said mileage is represented alphanumerically.

4. A portable electronic navigation apparatus according to claim 3 including auxiliary input means operatively coupled to said microcomputer and said second and said temporary memories and movable over the surface of said video display screen along the pattern of said displayed line and having keys thereon for inputting data representing a starting point, intermediate points, and a destination point along said line, whereby the user traces the linear landmark displayed and activates said keys to input a starting point and a destination point along the line pattern and intermediate points at which a line pattern changes direction and said microcomputer records the inputted points in said temporary memory, and after the starting, intermediate, and destination points have been entered into said temporary memory, the user presses a key to cause one of said programs in said second memory to calculate the differences between the latitude and longitude coordinates of the starting point, intermediate points, and the destination point, convert the calculated differences to mileage, and display the distance from the starting point to the destination point on said video display screen.

5. A portable electronic navigation apparatus according to claim 1 in which said visually displayed points or landmarks and said mileage and bearing or direction are represented on said video display screen alphanumerically.

6. A portable electronic navigation apparatus according to claim 1 in which said visually displayed points or landmarks are represented on said video display screen as a dot positioned on the screen corresponding to the latitude and longitude it represents, and said mileage is represented alphanumerically.

7. A portable electronic navigation apparatus according to claim 1 in which said visually displayed points or landmarks are represented on said video display screen as a dot positioned on the screen corresponding to the latitude and longitude it represents, the identification of said displayed points or landmarks are represented alphanumerically, and said mileage is represented alphanumerically.

8. A portable electronic navigation apparatus according to claim 1 including character generating means operatively connected to said video display controller for visually displaying said points or landmarks on said video display screen symbolically, whereby certain said points or landmarks are visually distinguished from other said points or landmarks.

9. A portable electronic navigation apparatus according to claim 1 in which said second memory includes a radius calculation program to calculate a radius of a specified distance surrounding the latitude and longitude coordinates of the destination location, starting location, or current location input by the user and to retrieve from said first memory or from said external memory means the points or landmarks having coordinates within a selected radius, whereby after the destination location, starting location, or current location data have been entered into said temporary memory, the user enters a selected radius distance and presses a key to cause said radius calculation program in said second memory to calculate a radius of the selected distance surrounding the latitude and longitude coordinates of the destination location, starting location, or current location, convert the calculated radius to mileage, and visually display the selected radius, the points or landmarks within the radius, and their mileage from the destination location, starting location, or current location on said video display screen.

10. A portable electronic navigation apparatus according to claim 9 in which said keyboard includes a key for inputting selected types of points or landmarks, and said radius calculation program is further executed to visually display the selected radius, only the selected types of points or landmarks within the selected radius, and their mileage from the destination location, starting location, or current location on said video display screen.

11. A portable electronic navigation apparatus according to claim 1 in which said second memory includes a path width calculation program to calculate a path width between a first and second location input by the user, whereby after the first and second location data has been entered into said temporary memory, the user enters a selected path width and presses a key to cause said path width calculation program in said second memory to calculate a path of the selected width extending between the latitude and longitude coordinates of the first and second locations, convert the calculated path width to mileage, and visually display the calculated path, the points or landmarks within the width of the path, and their mileage from the first location on said video display screen.

12. A portable electronic navigation apparatus according to claim 11 in which said keyboard includes a key for inputting selected types of points or landmarks, and said path width calculation program is further executed to visually display the selected path width, only the selected types of points or landmarks with the selected path width, and their mileage from the first location on said video display screen.

13. A portable electronic navigation apparatus according to claim 1 in which said second memory includes a trail calculation program to retrieve the latitude and longitude coordinates from said first memory or from said external memory means, calculate the differences between the latitude and longitude coordinates of a starting location, a destination location, and an intermediate location input by the user, whereby after the destination location and starting location data have been entered into said temporary memory, the user enters the identity of said intermediate location and presses a key to cause said trail calculation program in said second memory to retrieve the latitude and longitude coordinates from said first memory or from said external memory means, to calculate the differences in the latitude and longitude coordinates between the intermediate location and the starting location and between the intermediate location and the destination location, convert the calculated differences to mileage, determine the bearing or direction from the starting location to the intermediate location and from the intermediate location to the destination location and visually display the mileage and bearing or direction from the starting location to the intermediate location and from the intermediate location to the destination location on said video display screen.

14. A portable electronic navigation apparatus according to claim 1 in which said second memory includes an edit program to edit the identity or latitude and longitude coordinates retrieves from said first memory or from said external memory means and to receive the identity or latitude and longitude coordinates corresponding to said intermediate location input by the user and record them in said temporary memory, whereby the user can selectively edit stored coordinates of a location relative to said intermediate location and input the identity or edited latitude and longitude coordinates corresponding to the intermediate location, and after the identity or edited latitude and longitude coordinates have been entered into said temporary memory, the user enters the identity of said intermediate location and presses a key to cause said edit program in said second memory to retrieve the latitude and longitude coordinates from said first memory or from said external memory means, to calculate the differences in the latitude and longitude coordinates between the intermediate location and the starting location and between the intermediate location and the destination location, convert the calculated differences to mileage, determine the bearing or direction from the starting location to the intermediate location and from the intermediate location to the destination location, and visually display the mileage and bearing or direction from the starting location to the intermediate location and from the intermediate location to the destination location on said video display screen.

15. A portable electronic navigation apparatus according to claim 14 in which each successive intermediate location or edited coordinates which have been inputted by the user is stored in said temporary memory in the order inputted to represent a navigational trail of the intermediate or edited location entries, whereby after the last intermediate or edited location has been entered into said temporary memory, the user presses a trail key to cause a trail calculation program in said second memory to retrieve the intermediate or edited latitude and longitude coordinates from said temporary memory, to calculate the differences in the latitude and longitude coordinates between the intermediate or edited locations and the starting location and between the intermediate or edited location and the destination location, convert the calculated differences to mileage, determine the bearing or direction from the starting location to the intermediate or edited locations and from the intermediate or edited locations to the destination location in the order in which they were inputted and visually display the mileage and bearing or direction as a trail from the starting location to each of the intermediate or edited locations and from the intermediate or edited locations to the destination location on said video display screen.

16. A portable electronic navigation apparatus according to claim 1 in which said microcomputer includes audio controller means, a loudspeaker coupled to said audio controller means through a synthesizer and an amplifier, whereby the results of the calculated navigational data is converted by said audio controller and outputted as an audible synthesized voice through said synthesizer and amplifier.

17. A portable electronic navigation apparatus according to claim 1 in which said microcomputer includes a light source operatively connected to said power connecting means and said keyboard for illuminating said keyboard keys, and switch means operatively connected between said power connecting means and said light source for controlling the operation thereof.

18. A portable electronic navigation apparatus according to claim 1 in which;

said microcomputer comprises microprocessor for controlling the operation of the microcomputer, an input/output integrated control circuit connected between said microprocessor and said keyboard through interfaces to input data to the microprocessor, an input/output integrated control circuit connected between said microprocessor and said external memory receiving means through interfaces to control signals and data between said external memory means and said microprocessor, an integrated display control circuit connected between said microprocessor and said video display screen through a multiplexer to control display signals and data between said microprocessor and said video display screen, and display memory and character generating means connected between said multiplexer and said video display screen and having stored display pattern data for generating characters representing said points or landmarks and displaying said points or landmarks on said video display screen.

19. A portable electronic navigation apparatus according to claim 18 in which:

said integrated display control circuit includes a graphic color memory coupled with said display memory and character generating means having stored data representing primary colors for providing graded color display of data for generating color characters representing said points or landmarks and displaying said points or landmarks on said video display screen in predetermined colors.

20. A portable electronic navigation apparatus according to claim 18 in which;

said display memory and character generating means having stored data representing letters, numerals, and symbols.

21. A portable electronic navigation apparatus according to claim 18 in which;

said display memory and character generating means having stored data representing landmarks of the type comprising airports, buildings, parks, and geographical features.

22. A portable electronic navigation apparatus according to claim 18 in which;

said display memory and character generating means having stored data representing landmarks of the type comprising roadways, highways, rivers, railways, and boundary lines.

23. An electronic navigation method utilizing universal latitude and longitude coordinates for determining current location or a specific destination and the distance and bearing thereof relative to landmark data input by a user comprising the steps of:

providing a portable microcomputer including; a first permanent memory having stored data representing the identity and the latitude and longitude coordinates for the approximate physical center of various points or landmarks in a geographical area to be navigated, a second permanent memory having stored programs for processing data and controlling the operations of the microcomputer, a temporary memory for temporarily storing data in the course of computation, a keyboard for inputting data and operational commands, and a video display screen, entering the identity of a destination location from said keyboard, recording it in said temporary memory, and retrieving from said first permanent memory the coordinates corresponding to the destination location identity, and visibly displaying the retrieved destination location data or indicating that no data exists in said first permanent memory, entering the identity of a starting location from said keyboard, recording it in said temporary memory, and retrieving from said first permanent memory the coordinates corresponding to the starting location identity, and visibly displaying the retrieved starting location data or indicating that no data exists in said first permanent memory, upon an indication that no destination location data or starting location data exists in said first permanent memory, inputting from the keyboard the identity or latitude and longitude coordinates for the destination location or starting location, and recording said input identity or said latitude and longitude coordinates in said temporary memory, and after the destination and starting location data have been entered into said temporary memory, pressing a keyboard key to activated a calculation program in said second permanent memory to calculate the differences in the latitude and longitude coordinates between the starting location and the destination location, convert the calculated differences to mileage, determine the bearing or direction from the starting location to the destination location, and visually display the mileage and bearing or direction from the starting location to the destination location.

24. An electronic navigation method according to claim 23 including the steps of;

after the destination or starting location data has been entered into said temporary memory, pressing a keyboard key to activate a radius display program in said second permanent memory, inputting from the keyboard, a specified radius distance, and pressing a keyboard key to cause said radius calculation program in said second permanent memory to calculate a radius of the specified distance surrounding the latitude and longitude coordinates of the destination location or the starting location and visually display the calculated radius and other points or landmarks within the calculated radius and their mileage and direction or bearing from the destination or starting location.

25. An electronic navigation method according to claim 24 including the further steps of;

inputting from the keyboard, a selected type of points or landmarks, and pressing a keyboard key to cause said radius calculation program in said second permanent memory to visually display the specific radius and only the selected types of points or landmarks within the specified radius, and their mileage and direction or bearing from the destination or starting location.

26. An electronic navigation method according to claim 23 including the steps of;

after the destination or starting location data has been entered into said temporary memory, pressing keyboard key to activate a path display between the starting location and the destination location, inputting from the keyboard, a specified path width, and pressing a keyboard key to activate a path calculation program in said second permanent memory to calculate a path of the specified width between the latitude ad longitude coordinates of the destination location and the starting location and visually display the calculated path and points or landmarks within the calculated path width and their mileage and direction or bearing from the starting location.

27. An electronic navigation method according to claim 26 including the further steps of;

inputting from the keyboard, a selected type of points or landmarks, and pressing a keyboard key to cause said path calculation program in said second permanent memory to visually display the calculated path and only the selected types of points or landmarks within the specified path width, and their mileage and direction or bearing from the starting location.

28. An electronic navigation method according to claim 23 including the steps of;

after the destination or starting location data has been entered into said temporary memory, inputting from the keyboard, the identity of an intermediate location, and causing one of said programs in said second permanent memory to retrieve the coordinates of the intermediate location from said first permanent memory and calculate the difference in the coordinates between the intermediate location and the starting location and the intermediate location and the destination location and visually display the mileage and direction or bearing from the starting location to the intermediate location and from the intermediate location to the destination location.

29. An electronic navigation method according to claim 28 including the further steps of;

upon failure to retrieve the coordinates of the inputted intermediate location from said first permanent memory, said second permanent memory program displaying a message to the user to enter the identity or coordinates of the intermediate location from the keyboard and activating an edit program in said second permanent memory, inputting from the keyboard, the identity or latitude and longitude coordinates corresponding to an intermediate location and recording the identity or coordinates of the intermediate location in said temporary memory, editing the identity and coordinates of the intermediate location to approximate a desired intermediate location and inputting the edited identity or latitude and longitude coordinates into said temporary memory, and causing one of said programs in said second permanent memory to retrieve the coordinates of the edited intermediate location from said temporary memory, calculate the differences in the latitude and longitude coordinates between the edited intermediate location and the starting location and between the edited intermediate location and the destination location, convert the calculated differences to mileage, determine the bearing or direction from the starting location to the edited intermediate location and from the edited intermediate location to the destination location and visually display the mileage and bearing or direction from the starting location to the edited intermediate location and from the edited intermediate location to the destination location.

30. An electronic navigation method according to claim 2 including the further steps of;

entering each successive intermediate and edited intermediate location inputted by the user into said temporary memory in the order inputted to represent a navigational trail of the intermediate and edited intermediate location entries, and after the last intermediate or edited intermediate location has been entered into said temporary memory, causing a trail calculation program in said second permanent memory to retrieve the intermediate and edited locations from said temporary memory, calculate the differences in the coordinates between the intermediate and edited intermediate locations and the starting location and between the intermediate or edited intermediate locations and the destination location, convert the calculated differences to mileage, determine the bearing or direction from the starting location to the intermediate or edited intermediate locations and from the edited intermediate locations to the destination location in the order in which they were inputted and visually display the mileage and bearing or direction as said trail from the starting location to each of the intermediate or edited intermediate locations and from each of the intermediate or edited intermediate locations to the destination location.

31. A portable electronic navigation method according to claim 23 including the steps of;

storing data representing the identity and the latitude and longitude coordinates of linear landmarks in said first permanent memory in a linear continuum representing linear landmarks of the type comprising highways, roads, rivers, railways, and boundary lines, and entering the identity of a linear landmark from said keyboard, recording it in said temporary memory, and retrieving from said first permanent memory the linear coordinates corresponding to the linear landmark, and visibly displaying the retrieved linear landmark coordinates as a line positioned on said video display screen in a pattern corresponding to the latitude and longitude of said linear continuum of said coordinates, providing auxiliary input means operatively coupled to said first and second permanent and said temporary memories and movable over the surface of said video display screen and having keys thereon for inputting data representing a starting point, intermediate points, and a destination point along said line pattern, moving said auxiliary input means along the pattern of said displayed line to trace the linear landmark displayed and activating said keys to input a starting point and a destination point along the line pattern and selective intermediate points at which the line pattern changes direction and recording the inputted points in said temporary memory, and after the starting, intermediate, and destination points have been entered into said temporary memory, pressing a key to cause one of said programs in said second permanent memory to calculate the differences between the latitude and longitude coordinates of the starting point, intermediate points, and the destination points, convert the calculated differences to mileage, and display the distance from the starting point to the destination point on said video display screen.

* * * * *